(12) United States Patent
Gottlieb et al.

(10) Patent No.: US 9,278,871 B2
(45) Date of Patent: Mar. 8, 2016

(54) METHOD FOR REMOVING CHROMIUM FROM WATER USING WEAK BASE ANION EXCHANGE RESIN AT NEAR-NEUTRAL PH

(71) Applicant: ResinTech, Inc., West Berlin, NJ (US)

(72) Inventors: Michael C. Gottlieb, Cherry Hill, NJ (US); Peter S. Meyers, Marlton, NJ (US)

(73) Assignee: Resintech, Inc., West Berlin, NJ (US)

( * ) Notice: Subject to any disclaimer, the term of this patent is extended or adjusted under 35 U.S.C. 154(b) by 81 days.

(21) Appl. No.: 14/082,143

(22) Filed: Nov. 16, 2013

(65) Prior Publication Data

US 2015/0136706 A1    May 21, 2015

(51) Int. Cl.
| | |
|---|---|
| C02F 1/42 | (2006.01) |
| B01J 41/04 | (2006.01) |
| B01J 41/12 | (2006.01) |
| B01J 47/02 | (2006.01) |
| C02F 1/66 | (2006.01) |
| C02F 1/00 | (2006.01) |
| C02F 101/22 | (2006.01) |
| C02F 103/16 | (2006.01) |

(52) U.S. Cl.
CPC ............. *C02F 1/42* (2013.01); *B01J 41/046* (2013.01); *B01J 41/125* (2013.01); *B01J 47/026* (2013.01); *C02F 1/66* (2013.01); *C02F 1/008* (2013.01); *C02F 2001/422* (2013.01); *C02F 2101/22* (2013.01); *C02F 2103/16* (2013.01); *C02F 2209/003* (2013.01); *C02F 2209/06* (2013.01); *C02F 2209/44* (2013.01); *C02F 2301/08* (2013.01); *C02F 2303/00* (2013.01)

(58) Field of Classification Search
None
See application file for complete search history.

(56) References Cited

U.S. PATENT DOCUMENTS

| | | | |
|---|---|---|---|
| 3,414,510 A | | 12/1968 | Oberhofer |
| 3,972,810 A | * | 8/1976 | Chopra .......................... 210/676 |
| 4,036,751 A | | 7/1977 | Orita et al. |
| RE30,066 E | * | 8/1979 | Oberhofer ..................... 210/670 |
| 8,168,070 B2 | | 5/2012 | Gisch et al. |

| | | | |
|---|---|---|---|
| 2006/0037913 A1 | * | 2/2006 | Gottlieb et al. ............... 210/688 |
| 2007/0095758 A1 | * | 5/2007 | Bortun et al. .................. 210/669 |
| 2007/0114178 A1 | * | 5/2007 | Coppola et al. ............... 210/660 |
| 2015/0076072 A1 | * | 3/2015 | Chang et al. ................... 210/684 |

OTHER PUBLICATIONS

Abueg et al., "Presentation of Chromium 6—Final Report", Power Point presentation (2013).
Assessment of Single-Pass Ion Exchange and Adsorptive Media for Hexavalent Chromium Removal from Drinking Water, Periodic Report #2, Oct. 15, 2012.
Blute et al., "Hexavalent Chromium Removal from Drinking Water Using Anion Exchange Technologies", Power Point presentation presented to AWWA Inorganics Workshop, Jan. 29-31, 2006.
Blute et al., "State-of-the-Art Geochemical Techniques in Evaluating Drinking Water Treatment Contaminant Removal Processes", American Water Works Association—WQTC Conference, Nov. 4-8, 2007.
Chanda et al., "Selective chromate recovery with quaternized poly(4-vinylpyridine)", Reactive Polymers, vol. 21, pp. 77-88 (1993).
Chmielewski, "Superfund Site Cleanup of Chromate Contaminated Groundwater", Soil & Groundwater Magazine (Dec. 1999/Jan. 2000).
McGuire et al., "Hexavalent Chromium Removal Using Anion Exchange and Reduction with Coagulation and Filtration", Tailored Collaboration sponsored by AWWA Research Foundation and City of Glendale Water and Power (2007).
Material Safety Data Sheet from Resin Tech, Inc. for SIR-700 (2012).
Neshem, Jr., et al., "Advances in Hexavalent Chromium Removal at Hanford—12416" WM2012 Conference, Feb. 26-Mar. 1, 2012.
Neshem, Jr., et al., "Chromate Removal at the Hanford Site", Proceedings of the 72nd Meeting of the International Water Conference. IWC 11-41, 17 pp, 2011.
Nesham et al., "Efficiencies and Optimization of Weak Base Anion Ion-Exchange Resin for Groundwater Hexavalent Chromium Removal at Hanford—14202", Presented at Waste Management Symposium (2014).
International Search Report for PCT/US2014/065900 dated Feb. 9, 2015.

* cited by examiner

Primary Examiner — Chester Barry

(57) ABSTRACT

A method of removing chromium from water using a weak base anion exchange resin at a pH above about 5 includes the step of periodically reducing a flow of the water through the ion exchange resin for a rest period, such that a secondary mechanism of chromium removal predominates, wherein chromium ions are removed from the weak base anion exchange groups and precipitated inside the ion exchange resin. In an alternative embodiment, rather than resting, the ion exchange resin is periodically conditioned with an acid so as to enhance the secondary mechanism.

22 Claims, No Drawings

METHOD FOR REMOVING CHROMIUM FROM WATER USING WEAK BASE ANION EXCHANGE RESIN AT NEAR-NEUTRAL PH

BACKGROUND OF THE INVENTION

1. Field of Invention

This invention relates to a method for removing chromium from a substance, and more particularly to a method comprising the use of ion exchange media to remove hexavalent chromium from water.

2. Description of Related Art

Hexavalent chromium (Cr (VI)) is a hazardous material, which is generated in a number of industrial processes, and can contaminate ground and surface water. A variety of methods for removing hexavalent chromium from water have therefore been developed to prevent or remediate this issue. Perhaps the most prevalent of these is ion exchange.

For example, ion exchange technology has been used for remediation of chromate-contaminated water associated with the former Boomsnub Metal Plating facility in the state of Washington. According to Chmielewski, "Superfund Site Cleanup of Chromate Contaminated Groundwater," Soil & Groundwater Magazine (December 1999/January 2000), a weak base anion resin, SIR-700, has been used to remove hexavalent chromium from water. According to its manufacturer (ResinTech, Inc. of West Berlin, N.J.), SIR-700 has an epoxy polyamine polymer structure and has optimized capacity when the pH is below 5.

Although SIR-700 has proven to be a valuable means for removing chromate ions from water, the need to reduce the pH below 5 to achieve optimal capacity can add significant operating costs to the remediation process. Moreover, acidified water resulting from the remediation process can also have deleterious environmental effects. For example, there is concern that reintroducing such water to the aquifer surrounding the former plutonium production facility at Hanford, Washington could dissolve radioactive strontium into the groundwater. Neutralizing the water before release adds additional operating costs to the process.

Attempts have been made to overcome the issues associated with low pH processing by processing at a higher pH. However, the results have been less than completely satisfactory. At higher pH levels, unacceptable amounts of chromate leaks through the resin and the throughput of the process is inadequate.

U.S. Pat. No. 8,168,070 B2 purports to provide a strong base ion exchange resin that is more effective for removing chromium from water at neutral and alkaline pH values than at acidic pH values. The improvement is more of a refinement of an existing process offering incremental gains in performance.

Despite the foregoing development, it is desired to provide improved methods and systems for removing chromium from water, which methods and systems address the aforementioned issues associated with pH adjustment.

All references cited herein are incorporated herein by reference in their entireties.

BRIEF SUMMARY OF THE INVENTION

Accordingly, a first aspect of the invention comprises a method of removing chromium from chromium-rich water, said method comprising the steps of:

(a) providing an ion exchange resin comprising weak base anion exchange groups on a polymeric substrate;

(b) flowing the chromium-rich water through the ion exchange resin at a flow rate and for a flow time such that chromate ions are removed from the chromium-rich water by a primary mechanism wherein the chromate ions are exchanged with counter ions of the weak base anion exchange groups without substantially overburdening an ion exchange capacity of the weak base anion exchange groups;

(c) reducing a flow of the chromium-rich water through the ion exchange resin for a rest period, such that a secondary mechanism of chromium removal predominates, wherein chromium ions are removed from the weak base anion exchange groups and precipitated inside the ion exchange resin; and (d) repeating steps (b) and (c) for a number of cycles without replacing the ion exchange resin or substantially exceeding a total capacity of the ion exchange resin, wherein a pH of the chromium-rich water flowing into the ion exchange resin is greater than 5.5, and product water is obtained which contains a reduced amount of chromium relative to the chromium-rich water.

In certain embodiments, the chromium comprises hexavalent chromium.

In certain embodiments, the chromium-rich water comprises at least 100 ppb of chromium.

In certain embodiments, the weak base anion exchange groups comprise primary amine groups, secondary amine groups and/or tertiary amine groups.

In certain embodiments, the ion exchange resin is an epoxy polyamine.

In certain embodiments, the ion exchange resin is a phenolic resin.

In certain embodiments, the flow rate is less than 13 gallons per minute per cubic foot of resin.

In certain embodiments, the reduced amount of chromium in the product water is less than 100 ppb.

In certain embodiments, the rest period is greater than 15 minutes.

In certain embodiments, the number of cycles that steps (b) and (c) are repeated is from 1 to 5000 times without replacing the anion exchange resin.

In certain embodiments, the pH of the chromium-rich water flowing into the ion exchange resin is at least 6.5.

In certain embodiments, the method is conducted without adjusting a pH of the chromium-rich water or the product water.

In certain embodiments, the at least one cycle of the resting step comprises an acid conditioning step wherein the ion exchange resin is contacted with an acidic solution so as to accelerate a rate of reduction of hexavalent chromium to trivalent chromium. In certain of these embodiments, a pH is reduced such that an effluent from the ion exchange resin has a pH of 5.0 or less.

In certain embodiments, in the secondary mechanism, the chromium ions removed are hexavalent chromium ions, which are reduced to trivalent chromium and precipitated inside the ion exchange resin.

In certain embodiments, the weak base anion exchange groups comprise dimethylamine groups.

In certain embodiments, the method is conducted serially in at least two beds.

In certain embodiments, a chromium removal capacity is greater than a stoichiometric ion exchange capacity of the weak base anion exchange groups.

A second aspect of the invention comprises a method of removing chromium from chromium-rich water, said method comprising the steps of:

(a) providing an ion exchange resin comprising weak base anion exchange groups on a polymeric substrate;
(b) flowing the chromium-rich water through the ion exchange resin at a first pH, a first flow rate and for a first flow time such that chromate ions are removed from the chromium-rich water by a primary mechanism wherein the chromate ions are exchanged with counter ions of the weak base anion exchange groups without substantially overburdening an ion exchange capacity of the weak base anion exchange groups;
(c) flowing the chromium-rich water through the ion exchange resin for an acid conditioning period at a second pH, a second flow rate and for a second flow time such that a secondary mechanism of chromium removal is enhanced, wherein chromium ions are removed from the weak base anion exchange groups and precipitated inside the ion exchange resin; and
(d) repeating steps (b) and (c) for a number of cycles without replacing the ion exchange resin or substantially exceeding a total capacity of the ion exchange resin,
wherein the first pH is higher than the second pH and product water is obtained which contains a reduced amount of chromium relative to the chromium-rich water and has a product pH higher than the second pH.

In certain embodiments of the second aspect of the invention, the first pH is at least 6.0 and the second pH is not more than 5.5.

In certain embodiments of the second aspect of the invention: (i) steps (a) to (d) are conducted in at least one bed; (ii) steps (a) and (b) but not (c) or (d) are conducted in at least one other bed; (iii) effluents from the at least one bed and the at least one other bed are combined to provide a combined effluent having a final pH sufficiently high such that the final pH is not adjusted prior discharging the combined effluent to an environment.

In certain embodiments of the second aspect of the invention: (i) steps (a) to (d) are conducted in at least two beds operated in parallel; (ii) acidified effluent from step (c) is combined with the chromium-rich water for further treatment in the at least two beds.

DETAILED DESCRIPTION OF PREFERRED EMBODIMENTS OF THE INVENTION

The invention involves improved methods for operating weakly basic ion exchange systems for the removal of chromium from water, so as to overcome the high operation costs associated with pH adjustment without the disadvantages associated with continuously operating at a higher pH. The invention is largely based on the unexpected discovery that periodically resting the anion exchange resin enables the resin to function effectively at pH levels above 6 without undue chromium leakage, and actually increases the capacity of the resin.

The method is suitable for removing chromium from chromium-rich water, including aqueous compositions containing chromium and water. The expression "chromium-rich water" as used herein simply means water which contains a measurable amount of chromium, and can optionally contain other substances. The amount of chromium in the chromium-rich water is preferably at least a measurable amount, for example, at least 1 ppb. In certain embodiments, the amount of chromium in the chromium-rich water is at least 100 ppb, or is in the range of 1-10000 ppb or 20-500 ppb or 50-100 ppb. Unless the context suggests otherwise, the term "chromium" as used herein refers to chromium in its elemental state and as an ion in any of chromium's known oxidation states, including but not limited to, hexavalent chromium and trivalent chromium. Hexavalent chromium includes but is not limited to ions such as chromate, dichromate, and bichromate.

As indicated above, the pH of the chromium-rich water flowing into the anion exchange resin need not be maintained at 5.0 or 5.5 as in conventional methods involving weakly basic resins. The inventive method enables high capacity removal of chromium from chromium-rich water at relatively high pH levels, such as, e.g. at least 5.0, or at least 5.5, or least 6.0, or at least 6.5, or in the range of 5.0-6.7. The chromium-rich water flowing into the anion exchange resin is preferably not adjusted for pH and/or has a pH above 6, or 6 to 7, or 6.4 to 6.8 or 6.65 to 6.75. As the water flowing into the resin need not be pH adjusted, the product water flowing out of the resin need not be pH adjusted either.

The operating flow rate for a given system can be determined through routine experimentation, wherein the flow is optimized over multiple cycles while monitoring the amount of chromium leakage. Ion exchange experiments are often conducted in laboratories using columns of 1 inch diameter and in pilot plants with larger diameter columns. The unit volume flow rates collected during these experiments are used directly to scale up to the larger size equipment. In certain non-limiting embodiments, the flow rate is 0.1 to 13 gallons per minute per cubic foot of resin ($gpm/ft^3$), most preferably from 1 to 5 $m/ft^3$.

Ion exchange resins suitable for use in the invention remove chromium from chromium-rich water by at least two mechanisms—a primary mechanism and a secondary mechanism.

In the primary mechanism, chromate ions are exchanged with counter ions of the weak base anion exchange groups of the anion exchange resin. Preferably, the ion exchange capacity of the weak base anion exchange groups is not substantially overburdened during the method. The capacity is deemed to be substantially overburdened when the concentration of chromium in the effluent (i.e., the chromium leakage) is at least as high as the lesser of: (a) the concentration of chromium in the chromium-rich water or (b) 100 ppb (the current discharge limit set by the US EPA for total chromium). The concentration of chromium in the effluent from the anion exchange resin is monitored and the flow of chromium-rich water to the resin is terminated when the chromium concentration in the effluent is undesirably high and therefore potentially indicative of the ion exchange capacity of the resin being exhausted. It is preferred to maintain the chromium leakage below 100 ppb, more preferably below 10 ppb, still more preferably below 1 ppb and even still more preferably below detectable limits.

The chromate ions are preferably hexavalent chromium ions.

In the secondary mechanism, chromium ions are removed from the weak base anion exchange groups and precipitated inside the ion exchange resin. Under typical operating conditions, the rate of the secondary mechanism is lower than the rate of the primary mechanism. However, when inflow of the chromium-rich water is terminated, the secondary mechanism becomes the predominant mechanism such that more ions are precipitated by the secondary mechanism than captured by the primary mechanism during the rest period.

Suitable weak base anion exchange resins for use in the invention include but are not limited to weak base anion exchange resins wherein the anion exchange functional groups are primary, secondary or tertiary amines. In certain embodiments, the amines include at least one alkyl group selected from methyl, ethyl, propyl, butyl, penta, and hexyl.

The polymeric substrate is preferably an epoxy polyamine or phenolic resin. Other polymer substrates while not preferred are also able to perform. Particularly preferred as a weak base anion exchange resin is SIR-700, which is available from ResinTech Inc. of West Berlin, N.J. SIR-700 has primary, secondary and tertiary amine functionality and also exhibits a small amount of salt splitting capacity which may be indicative of some quaternary functionality.

The cycle of flow/terminated flow is repeated at least once such that at least 2 cycles are completed before the anion exchange resin is replaced. The maximum number of cycles is limited only by the overall capacity of the resin. Thus, 2, 10, 50, 100, 500, 1000, 5000, 10000, 100000 or more cycles are within the scope of the invention. In preferred embodiments, the cycle is repeated from 1 to 5000 times without replacing the anion exchange resin.

The duration of the rest period is largely dictated by the rate at which the secondary mechanism proceeds. The secondary mechanism rate and the rest period duration vary with the pH. Under acidic conditions, chromate is a fairly strong oxidizer and is itself reduced as part of the oxidation reduction reaction. Hexavalent chromium, an anion, converts to trivalent chromium, a cation. The redox reaction is pH dependent and occurs much more rapidly at low pH than at high pH. Thus, higher pH values tend to reduce the rate and require longer rest periods to refresh the anion exchange groups for the next cycle. The ideal rest period for a given system can be determined through routine experimentation, wherein the rest period is adjusted over multiple cycles while monitoring the amount of chromium leakage. Rest periods can be very short (e.g., on the order of a minute or less) or relatively long (e.g., on the order of 1-3 days or 1-2 weeks).

In addition to being conducted over multiple cycles, the inventive method can be conducted in a single-bed apparatus or an apparatus comprising at least two beds. One advantage of a multiple-bed apparatus is that the overall flow of chromium-rich water into the apparatus can be continuous by continuously diverting the flow from a bed ready to be rested to a bed ready to be brought online. It is also within the scope of the invention to connect the beds inline, such that the effluent from an upstream bed is further processed in one or more downstream beds.

In certain embodiments, the ion exchange resin can be treated with an acidic solution during the resting step to increase the secondary mechanism rate and accelerate a rate of reduction of hexavalent chromium to trivalent chromium, which precipitates inside the resin. This acid conditioning step comprises temporarily contacting the ion exchange resin with the acidic solution such that a pH of the resin is reduced, for example, such that an effluent from the ion exchange resin has a pH from 5.0 to 5.5. Acid conditioning down to as low as pH 2.0 is also within the scope of the invention. To avoid the need to neutralize the effluent before discharging it to the environment, the effluent can optionally be blended with effluent from the ion exchange resin before the acid conditioning step or recycled for later use in a subsequent acid conditioning step in the same or different bed.

The acidic solution is preferably hydrochloric acid, sulfuric acid or carbon dioxide. However, any acid can be used provided that its presence in the effluent is acceptable. For example, nitric acid will work but in potable water applications the presence of nitrate ions generally is considered objectionable. The acid can be reused directly (from one bed to another) or after storing and fortifying.

Water flowing out of the ion exchange resin (i.e., "product water") has been depleted of at least some of the chromium present in the chromium-rich water flowing into the resin. Preferably, the concentration of chromium in the product water is lower than in the influent water. More preferably the chromium concentration in the product water is less than 100 ppb, most preferably below detectable levels.

The method increases the chromium removal capacity of the ion exchange resin beyond what would be predicted from the stoichiometric and equilibrium relationships which can be calculated using the mass action relationships, the ionic composition of the influent water, the relative affinity of the other ions in the influent water that compete with the chromate ion for the resin's ion exchange capacity and the total capacity of the resin. In preferred embodiments, the chromium removal capacity is greater than a stoichiometric ion exchange capacity of the weak base anion exchange groups. However, in certain cases, especially those with high flow rates and/or unfavorable equilibrium, the improved capacity achieved by the inventive method, though higher, can be less than the stoichiometric capacity of the resin.

In the second aspect of the invention, multiple train operations can be conducted without a rest, wherein the ion exchange resin is periodically acid conditioned instead of rested. In such a case, it is preferred to combine the effluent from the bed being acid conditioned with effluents from other beds that are not, such that the diluted acid concentration (pH) of the combined effluents would be sufficiently diluted to reduce or eliminate the need to adjust the pH of the effluent before discharging it to the environment.

It is also within the scope of the invention to recycle the acidic effluent from the acid conditioned bed by adding it to the untreated water feeding the other beds being operated in parallel. When done correctly, the acid leaving the acid conditioned bed is absorbed by the other beds which undergo partial rejuvenation, consume the recycled acid and produce a more desirable effluent (higher) pH.

The invention will be illustrated in more detail with reference to the following Examples, but it should be understood that the present invention is not deemed to be limited thereto.

EXAMPLES

Example 1

Each bed of a dual-bed apparatus (or "train") was loaded with 77 ft$^3$ of ResinTech SIR-700. The two beds were connected in series such that effluent from the first bed flowed into the second bed. Three separate trains were tested as follows.

Chromium-rich water containing about 30 ppb of chromium had its pH adjusted to 6.7 prior to being fed into the first bed at a flow rate of about 100 gpm. The pH and chromium concentration of the effluent were monitored. After about 1 year, the chromium concentration of the effluent from the first bed had risen from about 1 ppb to as much as 10 ppb.

Example 2

Following the testing of Example 1, a dual-bed train was rested for 16 hours and then placed back online. After being placed back online, effluent from the first bed contained about 1 ppb of chromium.

Example 3

Following the testing of Example 1, a dual-bed train was taken offline for acid conditioning. The pH of the beds was reduced to about 5.0-5.5 over about 2 days. After being placed back online, effluent from the first bed contained about 1 ppb of chromium.

These examples confirm that hexavalent chromium in the form of anionic molecules is removed selectively by a weak anion exchange resin and that the mechanism of the selective removal and retention of the hexavalent chromium is greater than the ion exchange resin capacity of the resin when the inventive method is used. The test data show that the hexavalent chromium reacts with the polymer itself and remains fixed on the resin in a manner that allows the resin to continue to function as an ion exchange resin. The hexavalent chromium removal capacity is several times greater than the stoichiometric ion exchange capacity.

Without wishing to be bound by the theory, the inventors believe the mechanism by which the chrome is fixed is based on the chromate reaction with the polymer of the resin by a redox reaction, which results in a chrome containing substance that is not soluble, non-ionic and remains covalently bound to the resin.

While the invention has been described in detail and with reference to specific examples thereof, it will be apparent to one skilled in the art that various changes and modifications can be made therein without departing from the spirit and scope thereof.

What is claimed is:

1. A method of removing chromium from chromium-rich water, said method comprising the steps of:
    (a) providing an ion exchange resin comprising weak base anion exchange groups on a polymeric substrate;
    (b) flowing the chromium-rich water through the ion exchange resin at a flow rate and for a flow time such that chromate ions are removed from the chromium-rich water by a primary mechanism wherein the chromate ions are exchanged with counter ions of the weak base anion exchange groups without substantially overburdening an ion exchange capacity of the weak base anion exchange groups;
    (c) reducing a flow of the chromium-rich water through the ion exchange resin for a rest period, such that a secondary mechanism of chromium removal predominates, wherein chromium ions are removed from the weak base anion exchange groups and precipitated inside the ion exchange resin; and
    (d) repeating steps (b) and (c) for a number of cycles without replacing the ion exchange resin or substantially exceeding a total capacity of the ion exchange resin,
    wherein a pH of the chromium-rich water flowing into the ion exchange resin is greater than 5.5, and product water is obtained which contains a reduced amount of chromium relative to the chromium-rich water.

2. The method of claim 1, wherein the chromium comprises hexavalent chromium.

3. The method of claim 1, wherein the chromium-rich water comprises at least 100 ppb of chromium.

4. The method of claim 1, wherein the weak base anion exchange groups comprise primary amine groups, secondary amine groups and/or tertiary amine groups.

5. The method of claim 1, wherein the ion exchange resin is an epoxy polyamine.

6. The method of claim 1, wherein the ion exchange resin is a phenolic resin.

7. The method of claim 1, wherein the flow rate is less than 13 gallons per minute per cubic foot of resin.

8. The method of claim 1, wherein the reduced amount of chromium in the product water is less than 100 ppb.

9. The method of claim 1, wherein the rest period is greater than 15 minutes.

10. The method of claim 1, wherein the number of cycles that steps (b) and (c) are repeated is from 1 to 5000 times without replacing the anion exchange resin.

11. The method of claim 1, wherein the pH of the chromium-rich water flowing into the ion exchange resin is at least 6.5.

12. The method of claim 1, wherein the method is conducted without adjusting a pH of the chromium-rich water or the product water.

13. The method of claim 1, wherein at least one cycle of the resting step comprises an acid conditioning step wherein the ion exchange resin is contacted with an acidic solution so as to accelerate a rate of reduction of hexavalent chromium to trivalent chromium.

14. The method of claim 13, wherein a pH is reduced such that an effluent from the ion exchange resin has a pH of 5.0 or less.

15. The method of claim 1, wherein in the secondary mechanism, the chromium ions removed are hexavalent chromium ions, which are reduced to trivalent chromium and precipitated inside the ion exchange resin.

16. The method of claim 1, wherein the weak base anion exchange groups comprise dimethylamine groups.

17. The method of claim 1, wherein the method is conducted serially in at least two beds.

18. The method of claim 1, wherein a chromium removal capacity is greater than a stoichiometric ion exchange capacity of the weak base anion exchange groups.

19. A method of removing chromium from chromium-rich water, said method comprising the steps of:
    (a) providing an ion exchange resin comprising weak base anion exchange groups on a polymeric substrate;
    (b) flowing the chromium-rich water through the ion exchange resin at a first pH, a first flow rate and for a first flow time such that chromate ions are removed from the chromium-rich water by a primary mechanism wherein the chromate ions are exchanged with counter ions of the weak base anion exchange groups without substantially overburdening an ion exchange capacity of the weak base anion exchange groups;
    (c) flowing the chromium-rich water through the ion exchange resin for an acid conditioning period at a second pH, a second flow rate and for a second flow time such that a secondary mechanism of chromium removal is enhanced, wherein chromium ions are removed from the weak base anion exchange groups and precipitated inside the ion exchange resin; and
    (d) repeating steps (b) and (c) for a number of cycles without replacing the ion exchange resin or substantially exceeding a total capacity of the ion exchange resin,
    wherein the first pH is higher than the second pH and product water is obtained which contains a reduced amount of chromium relative to the chromium-rich water and has a product pH higher than the second pH.

20. The method of claim 19, wherein the first pH is at least 6.0 and the second pH is not more than 5.5.

21. The method of claim 19, wherein: (i) steps (a) to (d) are conducted in at least one bed; (ii) steps (a) and (b) but not (c) or (d) are conducted in at least one other bed; (iii) effluents from the at least one bed and the at least one other bed are combined to provide a combined effluent having a final pH sufficiently high such that the final pH is not adjusted prior to discharging the combined effluent to an environment.

22. The method of claim 19, wherein: (i) steps (a) to (d) are conducted in at least two beds operated in parallel; (ii) acidified effluent from step (c) is combined with the chromium-rich water for further treatment in the at least two beds.

\* \* \* \* \*